United States Patent [19]

Bühler et al.

[11] Patent Number: 4,920,239

[45] Date of Patent: Apr. 24, 1990

[54] ELECTRIC SWITCH, ESPECIALLY STEERING COLUMN SWITCH FOR MOTOR VEHICLES

[75] Inventors: Roland Bühler, Heilbronn; Herbert Erdelitsch, Bietigheim-Bissingen; Walter Hecht, Bietigheim-Bissingen; Horst Rachner, Bietigheim-Bissingen, all of Fed. Rep. of Germany

[73] Assignee: SWF Auto-Electric GmbH, Bietigheim-Bissingen, Fed. Rep. of Germany

[21] Appl. No.: 302,692

[22] PCT Filed: Oct. 28, 1987

[86] PCT No.: PCT/EP87/00637

§ 371 Date: Jan. 23, 1989

§ 102(e) Date: Jan. 23, 1989

[87] PCT Pub. No.: WO88/09272

PCT Pub. Date: Dec. 1, 1988

[30] Foreign Application Priority Data

May 22, 1987 [DE] Fed. Rep. of Germany ....... 3717251

[51] Int. Cl.$^5$ .......................... H01H 9/00; B60Q 1/14
[52] U.S. Cl. .................................................. 200/61.54
[58] Field of Search ....................... 200/4, 61.27, 61.3, 200/61.31, 61.34, 61.35, 61.54

[56] References Cited

U.S. PATENT DOCUMENTS 4,293,743  10/1981  Iwata et al. .............................. 200/4

FOREIGN PATENT DOCUMENTS

536536   8/1980   Australia .
2199709  4/1974   France .
2227741  11/1974  France .
2232064  12/1974  France .
2526580  12/1976  France .
2018027  10/1979  United Kingdom .

Primary Examiner—J. R. Scott
Attorney, Agent, or Firm—Robert P. Seitter

[57] ABSTRACT

In the switch housing of an electric switch a carrier is pivotally mounted between a housing cover plate and an intermediate cover plate by a pivot pin and a bearing bore. The switch lever of the switch can also be rotated about its longitudinal axis independently of the carrier and/or be rotated about an axis which is perpendicular to the axis of rotation of the carrier. A linearly movable slide is positioned between a housing base plate and the intermediate cover plate. The slide is adjusted by a movement of the switch lever which is independent of a carrier movement. In order to achieve this in a space-saving and simple way the pivot pin which acts as the carrier bearing in the intermediate cover plate is a hollow pin coupling the switch lever with the slide.

11 Claims, 7 Drawing Sheets

ELECTRIC SWITCH, ESPECIALLY STEERING COLUMN SWITCH FOR MOTOR VEHICLES

BACKGROUND OF THE INVENTION

This invention is directed to a steering column switch for motor vehicles of the type which is operable to independently control three different electrical circuits by manipulation of a single lever type actuator.

Steering column switches are known whose switch level can be moved in three different ways. The lever may be pivotable about two axes perpendicular to each other and the longitudinal axis of the lever and may be rotatable about its longitudinal axis. In order to make possible these kinds of motion a carrier is mounted in the switch housing so that it is rotatable about a first axis. The switch lever itself is mounted in the carrier in such a way that it can be pivoted relative to the carrier about a second axis perpendicular to the first axis. The switch lever includes a handle and a switch rod rotatable about the longitudinal axis of the switch lever.

Pivotal movement of the lever upon the carrier and the rotation of the switch lever are mostly transmitted onto contact pieces via operating studs of the switch lever and possibly available other intermediate members, which contact pieces are positioned directly over the base plate of the switch housing. It is thereby difficult to support the carrier well in the switch housing.

In a steering column switch which is known from the German laid open print DE-OS 2 512 225 and whose switch lever can in addition to a horizontal plane also be moved in a vertical plane, and in a steering column switch known from the German laid open print DE-OS 2 823 809 whose switch lever can additionally be moved also about its longitudinal axis there is an intermediate cover plate fixedly mounted in the switch housing, in which intermediate cover plate in addition to the bearing in the cover of the housing there is another bearing for the carrier. Just as in the steering column switch according to the DE-OS 2 512 225 the movement of the switch lever has in this case to be transmitted to the contact pieces through an aperture in the intermediate cover plate or, as according to the DE-OS 2 823 809, round the intermediate cover plate. This can necessitate complicated operating studs and complicated intermediate members or can mean a complicated shape of the intermediate cover plate. It can also be difficult to transmit the various motions of the switch lever onto several contact pieces when the space is narrow.

Therefore, as known from the DE-OS 2 508 178, the intermediate cover plate has been omitted and the carrier has only been supported in the cover of the switch housing.

The invention is directed to the problem of developing an electric switch in such a way that by retaining a double bearing for the carrier it is possible to transmit with simple parts and in a narrow space a vertical motion and/or a rotation of the switch lever about its longitudinal axis onto one or several slides located between the base plate and the intermediate cover plate of the switch housing.

In an electric switch according to the invention the switch lever is thus coupled with a slide directly through a bearing of the carrier. Additional apertures in the intermediate cover plate outside the bearing or complicated parts in order to circumvent the intermediate cover plate are thus not necessary.

Thus it is preferred that the switch lever carries an adjusting ring rotatively fixed, but axially slidable on a switch rod of the switch lever which encompasses by means of two wings a pin extending through the hollow pin which mounts the carrier on the intermediate plate. The point of application of the switch lever on the pin can be provided quite close to the switch rod, if the adjusting ring is open towards the switch rod between the wings. A good stability of the adjusting ring is retained if it is closed axially beside the wings towards the switch rod.

It is also advantageous that the switch lever, preferably via its adjusting ring, is coupled with the slide via an intermediate member and the intermediate member is linearly displaceably guided in the intermediate cover plate.

The range of motion of the slide need not be symmetrical relative to the axis of the carrier if the space conditions on the slide require that the intermediate member acts upon the slide outside the center.

An adjusting ring acts as a spring-loaded locking element which is movable along the switch rod and pressed against a counterpart by a spring, which counterpart is at rest when the switch lever is rotated about its longitudinal axis. It is even of advantage to use the adjusting ring as a locking element, if the switch lever is not coupled with the slide through the bearing of the carrier, but otherwise. The spring acting upon the adjusting ring can be used for another function, if another ring movable along the switch rod is fitted on it, which ring serves as a locking element for the swivelling motion of the switch lever relative to the carrier and if the spring, surrounding the switch rod, is braced between the adjusting ring and the other ring.

A slide potentiometer can be arranged on the base plate of the switch housing. The linearly movable slide of said potentiomter is adjustable upon a rotation of the switch lever about its longitudinal axis.

An electric switch has two linearly movable slides, wherein the second slide is guided in the first slide transversely to the moving direction of the latter. Furthermore the second slide is coupled via the switch lever via an intermediate member with regard to which the second slide is adjustable in the moving direction of the first slide. By a construction of this kind it is achieved in a simple manner that a swivelling motion of the switch lever adjusts both slides and a rotation of the switch lever about its longitudinal axis only the intermediate member and the second slide or vice versa. A design of this kind is especially favourable, if the same electric circuit is affected by operating the switch lever in one way and by operating the switch lever the other way. This design is therefore especially suitable to switch on the driving light of the motor vehicle and to change over between low beam and high beam. Only one bridging contact carried by the second slide is necessary for both functions and only three stationary contacts are needed.

The first slide carries advantageously a bridging contact provided for switching on the headlight flasher.

BRIEF DESCRIPTION OF THE DRAWINGS

Two embodiments of an electric switch according to the invention are shown in the drawings. The invention will now be described in detail by way of the figures of these drawings, in which.

DESCRIPTION OF THE PREFERRED EMBODIMENTS

The electric switches shown have a switch housing 10 including a base plate 11, a cover 12 and an intermediate cover plate 13. Intermediate plate 13 is fixedly mounted in the housing in spaced parallel relationship to the base plate. A carrier 15 is mounted in the switch housing to be pivoted about an axis 14, which carrier carries bridging contacts 16 co-operating with stationary contacts 17 injection-moulded into the base plate 11.

In order to support the carrier 15 within the housing for pivotal movement, a pin 22 formed on carrier 15 is received within a bore 20 in cover 12, and a hollow cylindrical projection 23 is received within a cylindrical recess 21 in intermediate plate 13, bore 20 and recess 21 having axes coaxial with axis 14.

Figure 5:
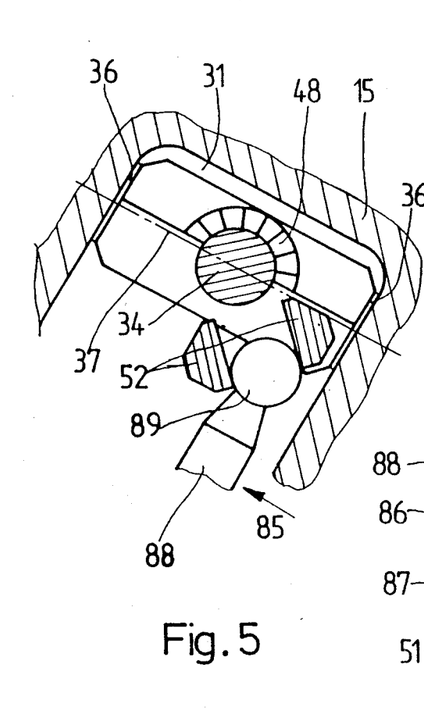
FIG. 5 is a partial section taken on the line V—V of FIG. 2, wherein the switch rod is turned in comparison with FIG. 2.

The electric switches shown have a switch lever on the whole designated 30, which switch lever projects into a hollow space 31 in the carrier 15. The most important parts of the switch lever 30 are a handle 32, a sleeve like outer member 33 and a switch rod 34 extending through the sleeve like outer member 33 and rotatable together with the handle 32 about a longitudinal axis 35 of the switch lever. The sleeve like outer member 33 includes pivot pins 36 (FIG. 5) which are coaxially aligned with each other and are positioned in opposed bearing bores in the carrier 15. The axis 37 of the pivot pins 36 extends through the axis 14 of the carrier 15 and is perpendicular to it. Thus the switch lever 30 may be pivoted relative to the carrier 15 about an axis 37 perpendicular to the axis 14.

Within the hollow space 31 of the carrier 15 an adjusting ring 40 and a locking ring 41 are fitted on the switch rod 34, which rings are biased apart by a helical compression spring 42 engaged between them and surrounding the switch rod 34. The locking ring 41 may be rotated relative to the switch rod 34 and retains its position when the switch rod 34 is rotated about the axis 35. Ring 41 has two lateral locking studs 43 pressed against a switching cam surface 44 on the carrier 15 by the spring 42. The studs 43 on the locking ring 41 and the switching cam 44 act as detents to determine the number and the locations of stable rest or operating positions of the switch lever 30 rotatively about the axis 37.

The adjusting ring 40 has two oblong holes 45 diametrically aligned with each other which are elongated longitudinally of the switch rod 34 and into which projects a pin 46 fixedly mounted in and projecting from the opposite sides of rod 34. Thus the adjusting ring 40 is held on the switch rod 34 against rotation, but can slide a limited amount longitudinally of the rod. The adjusting ring 40 is pressed against the serrated end 48 of the member 33 by the compression spring 42. The opposed surfaces 47 of the ring 40 and 48 of sleeve 33 have teeth and determine the number and locations of stable rest or operating positions of handle 32 and switch rod 34 relative to sleeve 33 rotatively about the longitudinal axis 35 of lever 30.

An operating stud 50 is formed integrally with the sleeve member 33. Stud 50 projects into an arcuate slot 51 in a slide 60 located between base plate 11 and intermediate cover plate 13. Wings 52 protruding in the direction of the intermediate cover plate 13 are formed onto the adjusting ring 40. These wings can jointly be regarded as an operating stud of the adjusting ring 40. Longitudinally of the switch rod 34 the wings 52 project beyond the end face 47 of the adjusting ring 40, so that they overlap the axis 14 of the carrier. The adjusting ring is open between the wings.

Longitudinally of the switch rod 34 beyond the wings 52 the adjusting ring 40 is closed by a web or annulus 53 extending entirely around the switch rod 34. A head 88 of an intermediate member to be described in detail below can be received between the wings 52 very close to the axis of rotation 35 of the switch rod 34 while the ring 40 is stably supported upon switch rod 34.

In the embodiment according to FIGS. 2 to 5 the carrier 15 is movable from a neutral center position pivotable about axis 14 in either direction. The direction in which the slide 60 is adjustable by the operating stud 50 is perpendicular to the axes 14 and 37 when carrier 15 occupies its center position. The slide 60 has the shape of a frame and is guided between two parallel walls 61 and 62 rising from the base plate. In a frame member 63 extending in sliding direction the slide has a recess 64 for a bridging contact 65 which can be switched with the headlight flasher by lifting the switch lever slightly; for example pivoting the lever upwardly about axis 37 and thus displacing the slide 60 to the left from the position shown in FIG. 3. The bridging contact 65 then interconnects the blade terminals 66 and 67.

In the slide 60 there is guided a second slide 70 which is movable relative to slide 60 in a in a direction perpendicular to the sliding direction of the slide 60. The slide 70 has three parallel slots 71 each with one bridging contact 72, 73 or 74 pressed against the base plate 11 by a compression spring 75 supported on the slide 70 and pressing the latter against the intermediate cover plate 13. The bridging contacts 72, 73 and 74 have lateral control studs 76 by which they project over two identical control cams 77 on the slide 60. Upon an adjustment of the slide 70 relative to the slide 60 the bridging contacts 72 to 74 are thus also lifted off the stationary contacts or put on them.

Independently of the position of the slide 60 the slide 70 is adjusted by turning the handle 32 of the switch lever 30 about the axis 35. Three stable operating positions of the handle 32 with the switch rod 34 and thus three stable switching positions of the slide 70 relative to the slide 60 are established by the teeth at the end 48 between the bearing member 33 of the switch lever 30 and the opposed end of adjusting ring 40 and by corresponding stops. By rotating rod 34 within sleeve member 33, wings 52 of adjustment ring 40 drive pin 88 to the left or to the right as viewed in FIG. 4, depending on the direction in which rod 34 is rotated. Pin 90, fixed to pin 88 via strip 86 engages the appropriate side wall of hole 92 to drive slide 70 to the left or right as viewed in FIG. 4. In the zero position, in which the slide 70 is displaced to the left from the position shown in FIG. 4, all bridging contacts 72, 73 and 74 are lifted off the base plate 11. In the central position shown in FIG. 4 the bridging contact 73 connects the stationary contact 78 with the blade terminal 67, to complete, for example, a circuit by which the side-marker lamps are switched on. In the third switching position at last the bridging contact 72 connects the stationary contact 78 with the blade terminal 67, so that the side-marker lamps continue to be switched on and an additional circuit is completed in which the bridging contact 73 connects the stationary contact 79 with the blade terminal 67. Thereby a circuit for a fog warning lamp may be completed. The bridging contact 74 finally connects the stationary contact 80 with the blade terminal 67 in the vertical central operating position of the switch lever and in the headlight flasher position. The low beam is switched on. In the third vertical operating position of the switch lever however the bridging contact 74 connects the blade terminal 66 with the blade terminal 67. The high beam is switched on.

Figure 1:
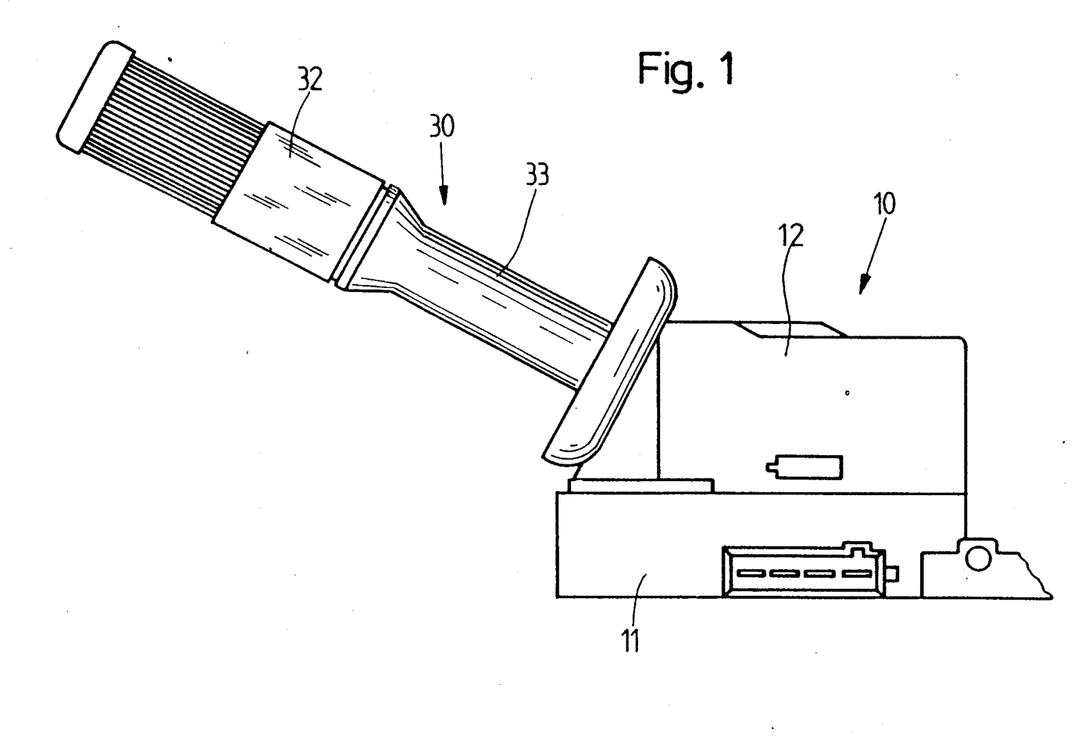
FIG. 1 is an outside view of a steering column switch according to the invention.
Figure 2:
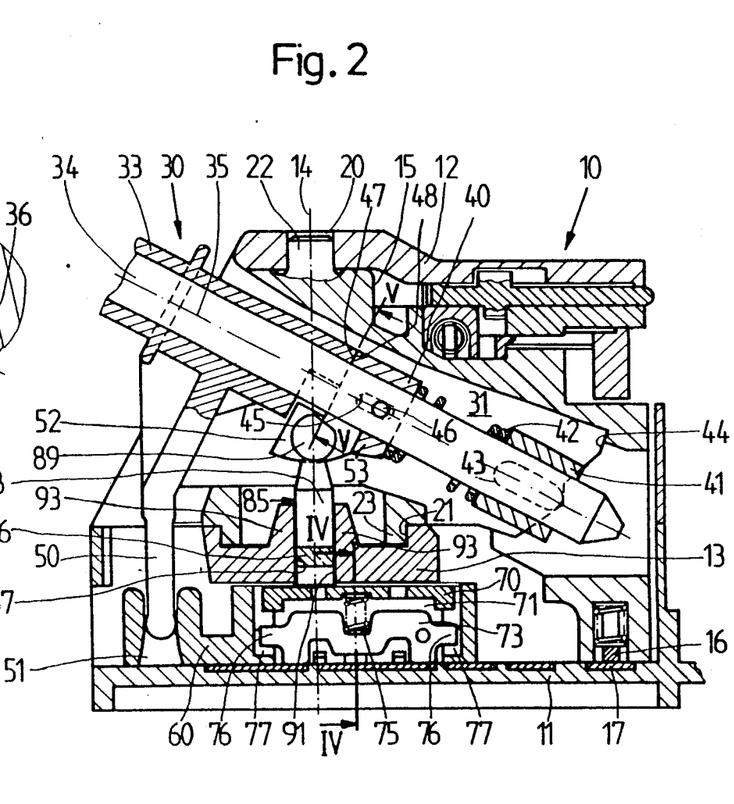
FIG. 2 is an embodiment with two slides of which the second one is guided in the first one in a vertical section through the base plate and through the swivelling axis of the carrier.
Figure 3:
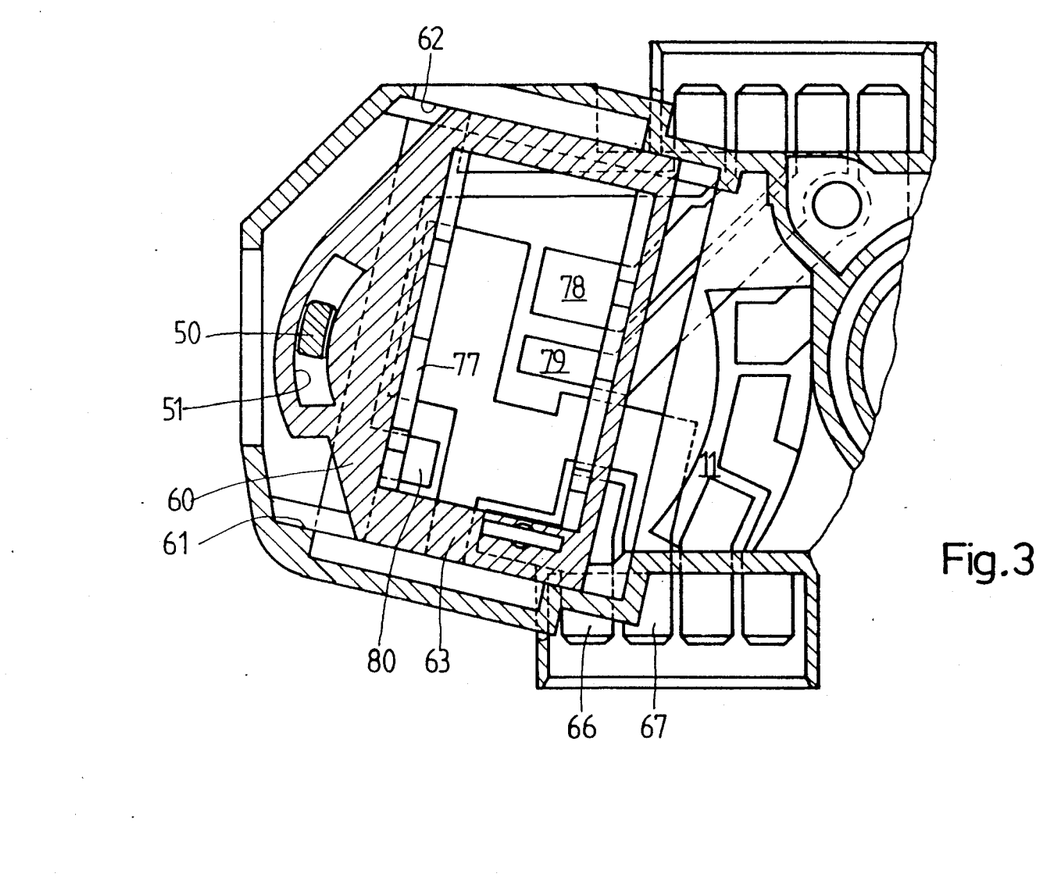
FIG. 3 is a section through the first slide in parallel to the base plate, wherein the second slide has been omitted.
Figure 4:
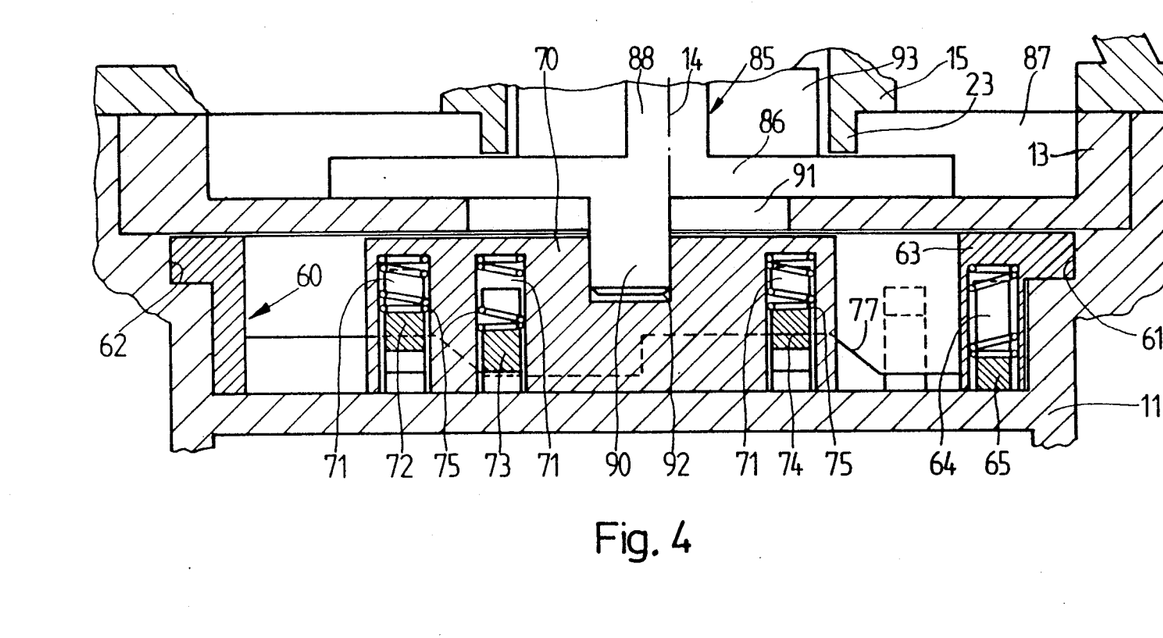
FIG. 4 is a section through the second slide taken along the line IV—IV of FIG. 2.

The slide 70 is operated from the adjusting ring 40 via an intermediate member 85 slidably guided in a slot 87 in the intermediate cover plate 13 extending parallel to the direction of movement of the slide 70 relative to the slide 60 by means of an elongate strip 86 on member 85 slidably received in slot 87. The long and narrow strip 86 provides a good guidance of the intermediate member. On one side a conical pin 88 is integrally formed onto the strip 86, which pin projects through the hollow pin 23 of the carrier. A ball 89 fixed to the end of pin 88 is received between the two wings 52 of the adjusting ring 40. The guidance of the intermediate member 85 is even improved by walls 93 along the rim of slot 87, between which walls the pin 88 is positioned. In the central position of the slide 70 which is shown in FIG. 4 the axis of the pin 88 coincides with the axis of rotation 14 of the carrier 15.

On the other hand a pin 90 is formed onto the strip 86 in offset relationship to the pin 88 longitudinally of the strip 86 and projects into an oblong hole 92 of the slide 70 through an aperture 91 in the intermediate cover plate 13. Thus the slide 70 can be moved together with the slide 60 without being thereby impeded by the pin 90 of the intermediate member 85.

Strip 86 is longer than the aperture 91 and the aperture 91 corresponding to the pin 90 is arranged asymmetrically to the axis 14 of the carrier 15.

Figure 6:
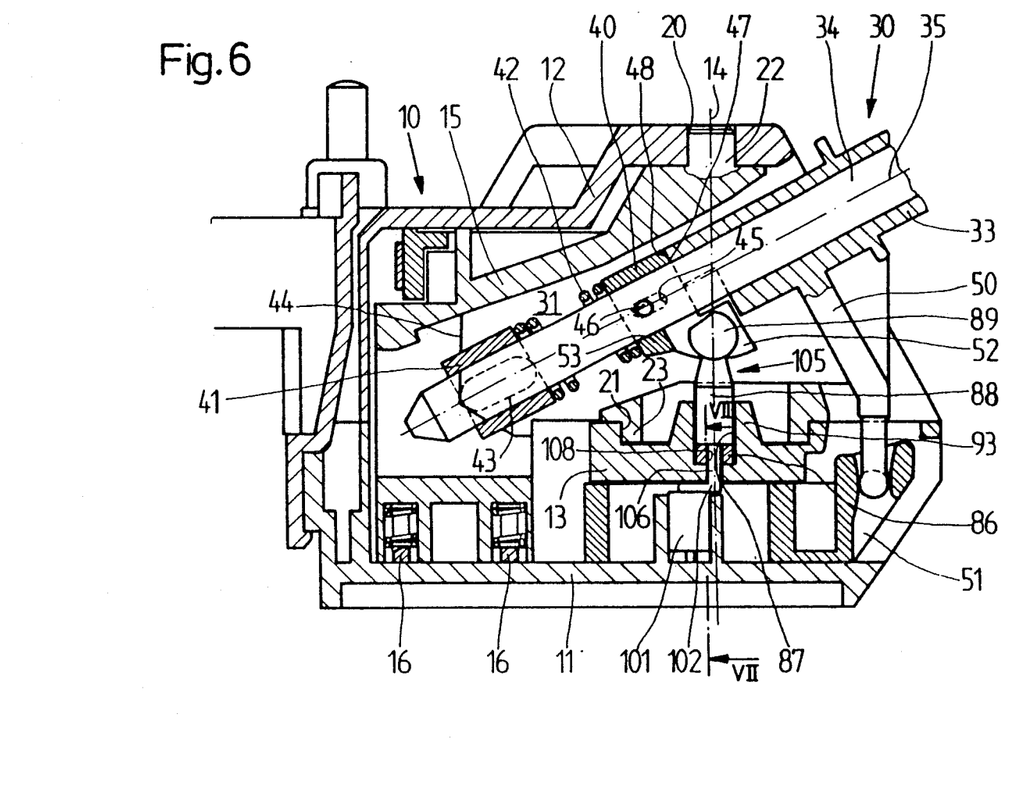
FIG. 6 is an embodiment with a slide potentiometer in a section corresponding to that of FIG. 2.
Figure 7:
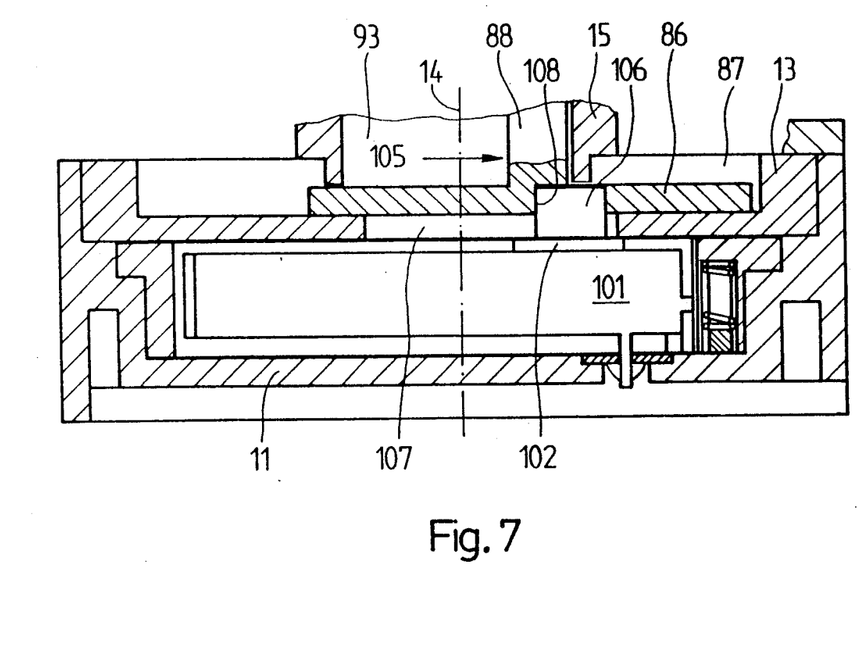
FIG. 7 is a section taken on the line VII—VII of FIG. 6
Figure 8:
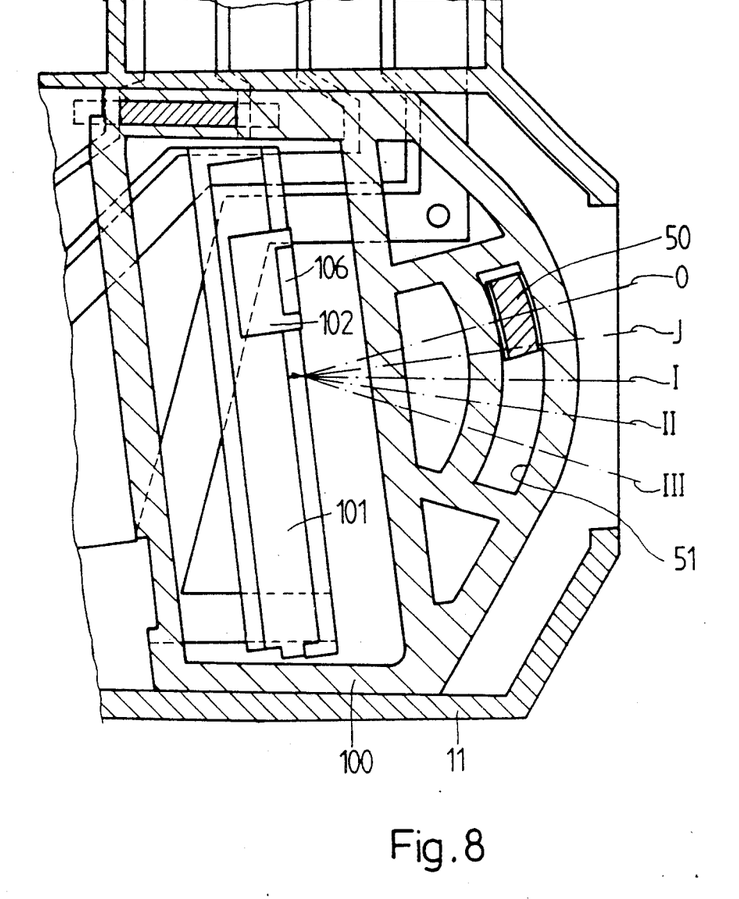
FIG. 8 is a section through the second embodiment corresponding to the section of FIG. 3.

In the embodiment according to FIGS. 6 to 8 a slide 100 is linearly moved via the operating stud 50 of the sleeved member 33 of the switch lever 30. This slide is also formed in the manner of a frame similar to the slide 60 of the first embodiment. However no further slide is guided in the slide 100. Within the frame there is instead fitted on the base plate a slide potentiometer 101 with a slide 102.

The electric switch shown in FIGS. 6 to 8 may serve to control the wiper systems of a motor vehicle. When the switch lever 30 and the carrier 15 are swivelled about the axis 14 from a neutral position 0 about the axis 14 into the adjacent operating position J the wiper system is controlled in intermittent operation. In one or several following operating positions I, II, III continuous operation of the wiper system with different speeds is selected. The slide potentiometer serves for varying the interval time during intermittent operation. Its slide 102 is therefore in the first instance moved in the intermittent operation position J of the switch lever 30 and of the carrier 15. Therefore the potentiometer is arranged on the base plate 11 in such a way that in the intermittent operation position of the switch lever 30 and the carrier 15 the axis of rotation 35 of a handle and the switch rod 34 extends vertically to the moving direction of the slide 102.

The slide 102 of the slide potentiometer 101 is displaced by rotation of rod 35 and the adjusting ring 40 via an intermediate member 105 in the same way as the slide 70 of the first embodiment.

The intermediate member 105 is constructed very similar to the intermediate member 85 of the first embodiment. It is guided in a groove 87 of the intermediate cover plate 13 in one direction by means of a strip 86, in which direction the slide 102 of the slide potentiometer 101 can be moved. Just as was the case with the intermediate member 85, the intermediate member 105 also is engaged between the wings of the adjusting ring 40 by the end 89 of a conical pin 88. In contrast to the first embodiment the intermediate member 105 and the slide 102 are now coupled in that the slide 102 engages with a quadrant stud 106 through an aperture 107 in the intermediate member 13 into a recess 108 in the strip 86 of the intermediate member 105. The length of the recess 108 in the sliding direction corresponds to the length of the stud 106. The aperture 107 in contrast thereto is larger than the stud 106, so that intermediate member 105 and slide 102 can be displaced relative to the intermediate cover plate 13. The recess 108 is set off in the sliding direction relative to the pin 88 of the intermediate member 105 similar to the pin 90 in the first embodiment. The same applies for the aperture 107 relative to the axis 14 of the carrier 15.

We claim:
1. In an electric steering column switch;
a hollow housing including a base plate lying in a first general plane and a cover overlying said base plate, said housing having an opening in one side thereof, an intermediate plate fixedly mounted within said housing between said base plate and said cover in spaced parallel relationship to said base plate, means defining a relatively large diameter cylindrical recess in said intermediate plate and a relatively small diameter bore in said cover in coaxial alignment with each other along a first axis normal to said first general plane, a carrier, first and second pivot means on said carrier respectively received in said cylindrical recess and said bore to support said carrier within said housing for rotation relative to said housing about said first axis, said carrier having an internal recess therein extending inwardly of said carrier from the side of said carrier adjacent said one side of said housing, elongate lever means having a longitudinal axis and an inner end located within said internal recess in said carrier and projecting from said internal recess through said opening in said housing to an outer end accessible at the exterior of said housing, said lever means including a sleeve like outer member and a rod like inner member rotatable within said outer member about said longitudinal axis, third pivot means mounting said sleeve like member upon said carrier for pivotal movement relative to said carrier about a third axis normal to said longitudinal axis and parallel to said first general plane, a first slide member mounted between said base plate and said intermediate plate for movement relative to said housing along a first linear path parallel to said first general plane, post means coupled to said first slide member and projecting from said first member into said internal recess in said carrier slide through a first opening in said intermediate plate and a second opening extending coaxially through said first pivot means on said carrier, and first coupling means rotatively fixed to said rod like member of said lever means and engaged with said post to drive said first slide member in movement along said first path upon rotation of said rod like member about the longitudinal axis of said lever means.

2. The invention defined in claim 1 wherein said sleeve like member terminates at one end within said internal recess in said carrier and said rod like member projects inwardly of said recess beyond said one end of said sleeve like member, and said first coupling means comprises an annular first ring member received on said rod like member and a pin rotatively locking said first ring member to said rod like member, said first ring member having a pair of spaced opposed wing portions fixed to and projecting tangentially from said first ring member to receive said post therebetween.

3. The invention defined in claim 2 wherein said first ring member has a pair of diametrically opposed slots therethrough elongated axially of said first ring member and said pin includes opposed ends projecting radially from said rod like member into said slots to rotatively lock said first ring member to said rod like member while accommodating axial movement of said first ring member relative to said rod like member, and detent means including spring means biasing said first ring member against said one end of said sleeve like member for releasably retaining said rod like member at selected positions of rotative adjustment relative to said sleeve like member.

4. The invention defined in claim 3 wherein said detent means further comprises a second ring member received on said rod like member for rotary and axial sliding movement relative to said rod like member, projections projecting from diametrically opposed sides of said second ring member engaged with respective detent cam surfaces on said carrier, said spring means being engaged between said first and second ring members to bias said first ring member toward said sleeve like member and to bias said second ring member toward said detent cam surfaces on said carrier.

5. The invention defined in claim 2 wherein said ring member includes a hollow cylindrical ring section at one axial end of said ring member integrally joined to a coaxial hollow semi-cylindrical extension at the other axial end of said ring member, and plate like webs extending tangentially from said semi-cylindrical extension to define said wing portions.

6. The invention defined in claim 1 wherein said housing further includes a pair of opposed side walls at opposite side to side opening and said intermediate plate extends laterally between said opposed side walls across said opening, and means on said base plate guiding said slide member along said first path, said first path extending laterally between said opposed side walls.

7. The invention defined in claim 1 further comprising a second slide member mounted between said base plate and said intermediate plate for movement relative to said housing along a second linear path parallel to said first general plane and perpendicular to said first linear path, and second coupling means including an operating stud fixed to said sleeve like member and engaged in at slot in said second slide member operable upon pivotal movement of said sleeve like member about said third axis to drive said second slid member in movement along said second path.

8. The invention defined in claim 7 wherein said second slide member is slidably supported on said base plate, guide means on said base plate engaged with said second slide member for guiding said second slide member along said second path, means on said second slide member defining a second opening through said second slide member from first base plate to said intermediate plate and a slide way in said second opening slidably supporting said first slide member on said second slide member for movement in said second opening relative to said second slide member and said housing along said first path.

9. The invention defined in claim 8 wherein said post means includes a third slide member slidably guided within said first opening in said intermediate plate for movement relative to said intermediate plate along a path parallel to said first linear path, a first post on said third slide member engaged with said first coupling means, and a second post on said third slide member received within a slot in said first slide member elongated in a direction parallel to said second linear path.

10. The invention defined in claim 9, wherein said first and second posts projects from opposed sides of said third slide member along respective axes normal to said first general plane and laterally offset from each other.

11. The invention defined in claim 8 further comprising electric contact means mounted in said first slide member for movement toward and away from said base plate, and cam means on said second slide member engageable with said contact means for moving said contact means toward and away from said base plate in response to movement of said first slide member along said first path.

* * * * *